United States Patent
Higgins

(10) Patent No.: US 8,346,808 B2
(45) Date of Patent: Jan. 1, 2013

(54) SYSTEM AND METHOD OF ACCESSING RESOURCES IN A COMPUTER NETWORK

(75) Inventor: Rodger Higgins, Aurora, IL (US)

(73) Assignee: Westell Technologies, Inc., Aurora, IL (US)

( * ) Notice: Subject to any disclaimer, the term of this patent is extended or adjusted under 35 U.S.C. 154(b) by 59 days.

(21) Appl. No.: 12/855,141

(22) Filed: Aug. 12, 2010

(65) Prior Publication Data

US 2011/0040814 A1 Feb. 17, 2011

Related U.S. Application Data

(60) Provisional application No. 61/233,283, filed on Aug. 12, 2009.

(51) Int. Cl.
*G06F 7/00* (2006.01)
(52) U.S. Cl. .................................................. 707/783
(58) Field of Classification Search .................. 707/783, 707/784, 785
See application file for complete search history.

(56) References Cited

U.S. PATENT DOCUMENTS

| | | | |
|---|---|---|---|
| 2003/0225796 A1* | 12/2003 | Matsubara | 707/200 |
| 2006/0123117 A1* | 6/2006 | Heutchy et al. | 709/227 |
| 2006/0168136 A1* | 7/2006 | Bethlehem et al. | 709/219 |
| 2009/0083414 A1* | 3/2009 | Lazovsky et al. | 709/224 |
| 2010/0146611 A1* | 6/2010 | Kuzin et al. | 726/8 |

* cited by examiner

*Primary Examiner* — Amy Ng
(74) *Attorney, Agent, or Firm* — McDonnell, Boehnen, Hulbert & Berghoff, LLP

(57) ABSTRACT

An exemplary method of accessing resources in a computer network may include (a) receiving into a networking device, from a first client device of a plurality of client devices, a request for a given resource (e.g., a file, directory, or metadata) assigned to a given file service (e.g., a file share service, file sync service, or file search service), (b) verifying that the first client device is allowed to access the given file service, (c) in response to verifying that the first client device is allowed to access the given file service, identifying a second client device having at least one stored resource assigned to the given file service, and (d) sending to the second client device an updated request for the given resource that includes a unique identifier of the at least one stored resource assigned to the given file service.

23 Claims, 6 Drawing Sheets

SYSTEM AND METHOD OF ACCESSING RESOURCES IN A COMPUTER NETWORK

PRIORITY

This application claims priority to U.S. Provisional Patent Application Ser. No. 61/233,283 filed Aug. 12, 2009, incorporated by reference herein in its entirety.

BACKGROUND

Recent trends in computing have led to the need for better information sharing between computing devices in a home network. The first of these trends is the extensive proliferation of Internet-based services that are available for consumers, including webmail, photo sharing, social networking, online auctioning, and even replacements for traditional desktop applications (e.g., word processing, spreadsheets, presentations, etc.). While there are various benefits to using Internet-based services, including low cost, ease of installation and maintenance, and portability across multiple devices, these Internet-based services also suffer from various limitations. For example, a user of an Internet-based service may be unable to access his data due to various factors, such as server unavailability and/or account lockout. As another example, a user of an Internet-based service may encounter various privacy issues, such as lesser privacy protection under the law, weak web security systems, and/or client software that has complete access to all of the user's file system. As yet another example, a user of an Internet-based service may be subjected to data lock-in and third-party control. Many of these limitations may be overcome by storing the user's data in the home as opposed to the cloud.

The second of these trends is proliferation of post-PC computing devices in the home. Examples of these post-PC computing devices may include smart phones, smart thermostats, set-top boxes, netbooks, tablets, and digital picture frames. Many of these post-PC devices are based on closed platforms that largely inhibit interoperability. While some current file sharing protocols exist that may facilitate interoperability between these and other computing devices, including network file protocols and server-based protocols (e.g., File Transfer Protocol (FTP) or a Web-based Distributed Authoring and Versioning (WebDAV)), these current file sharing protocols have significant limitations. For instance, network file protocols require synchronization of three separate levels of security—one for each computing device and one for the network file protocol itself—which is typically not practical in a home network. Further, network file protocols that enable file sharing between computing devices based on different closed platforms may be unavailable or out-of-date depending on the relationship between the developers of those closed platforms. Further yet, server-based protocols require a user to setup and manage servers and also fail to integrate the remote files with the user's local files such that they appear as part of the user's file system.

Accordingly, a protocol that facilitates seamless, secure information sharing between computing devices via a home network, as well as remote devices via the Internet, is desirable.

Overview

Disclosed herein are systems and methods that enable seamless, secure information sharing between computing devices (e.g., client devices, networking devices, servers, etc.) in a network (e.g. a local area network).

One embodiment may take the form of a method including (a) receiving into a networking device, from a first client device of a plurality of client devices, a request for a given resource (e.g., a file, directory, or metadata) assigned to a given file service (e.g., a file share service, a file sync service, or a file search service), (b) in response to the request, verifying that the first client device is allowed to access the given file service, (c) in response to verifying that the first client device is allowed to access the given file service, identifying a second client device of the plurality of client devices having at least one stored resource assigned to the given file service, and (d) sending to the second client device an updated request for the given resource that includes a unique identifier of the at least one stored resource assigned to the given file service. Additionally, the method may include (e) as a result of sending the updated request to the second client device, receiving from the second client device the given resource, and (f) forwarding the given resource to the first client device. This method may be embodied as program instructions on a non-transitory computer readable medium.

The feature of verifying that the first client device is allowed to access the given file service may take various forms. In one example, this feature may include (1) identifying a user associated with the first client device and (2) determining that the identified user is allowed to access the given file service based on a table mapping file services to identifiers of users allowed to access the file services. Other examples are possible as well.

The feature of identifying the second client device may also take various forms. In one example, if the request identifies a given client device of the plurality of client devices, this feature may include identifying the given client device as the second client device based. In another example, this feature may include identifying the second client device based on a table mapping file services to client devices having at least one resource assigned to the given file service. In yet another example, this feature may include identifying the second client device (1) identifying two or more client devices of the plurality of client devices having at least one resource assigned to the given file service and (2) employing load balancing to select the second client device from the identified two or more client devices. Other examples are possible as well.

Another embodiment may take the form of a method including (a) receiving, into a first client device of a plurality of client devices, a request to assign at least one resource (e.g., a file, directory, or metadata) stored on the first client device to a given file service (e.g., a file share service, a file sync service, or a file search service), (b) in response to the request, generating a unique identifier of the at least one stored resource on the first client device that correlates to a storage location on the first client device of the at least one stored resource, (c) sending to a networking device the unique identifier of the at least one stored resource that is assigned to the given file service, (d) receiving from the networking device a request for a given resource (e.g., a file or directory) assigned to the given file service, wherein the request includes the unique identifier of the at least one stored resource that is assigned to the given file service, (e) locating the given resource on the first client device based on the correlation of the unique identifier of the at least one stored resource to the stored location on the first client device of the at least one stored resource, and (f) sending the given resource for receipt by a second client device of the plurality of client devices (e.g., via the networking device). This method may be embodied as program instructions on a non-transitory computer readable medium.

The request to assign the at least one stored resource to the given file service may take various forms. In one example, this request may include a selection of the given file service on a context menu for the at least one stored resource. Other examples are possible as well.

Yet another embodiment may take the form of a network device that includes (a) a communication interface configured to interface with a plurality of client devices, (b) an access manager component configured to (1) receive, from a first client device of the plurality of client devices, a request for a given resource assigned to a given file service, (2) in response to the request, verify that the first client device is allowed to access the given file service, and (3) in response to verifying that the first client device is allowed to access the given file service, forward the request, and (c) a storage manager component configured to (1) receive the request from the access manager component, (2) identify a second client device of the plurality of client devices having at least one stored resource assigned to the given file service, and (3) send to the second client device an updated request for the given resource that includes a unique identifier of the at least one resource assigned to the given file service.

Still another embodiment may take the form of a client device that includes (a) a communication interface configured to interface with a networking device, and (b) a drive agent shim configured to (1) receive a request to assign at least one resource stored on the client device to a given file service, (2) in response to the request, generate a unique identifier of the at least one stored resource that correlates to a storage location on the client device of the at least one stored resource, (3) send to a networking device the unique identifier of the at least one stored resource that is assigned to the given file service, (4) receive from the networking device a request for a given resource assigned to the given file service, wherein the request includes the unique identifier of the at least one stored resource that is assigned to the given file service, (5) locate the given resource on the client device based on the correlation of the unique identifier of the at least one stored resource to the storage location on the client device of the at least one stored resource, and (6) send the given resource for receipt by another client device.

These as well as other aspects and advantages will become apparent to those of ordinary skill in the art by reading the following detailed description, with reference where appropriate to the accompanying drawings.

DETAILED DESCRIPTION

I. Exemplary Communication System

Figure 1:
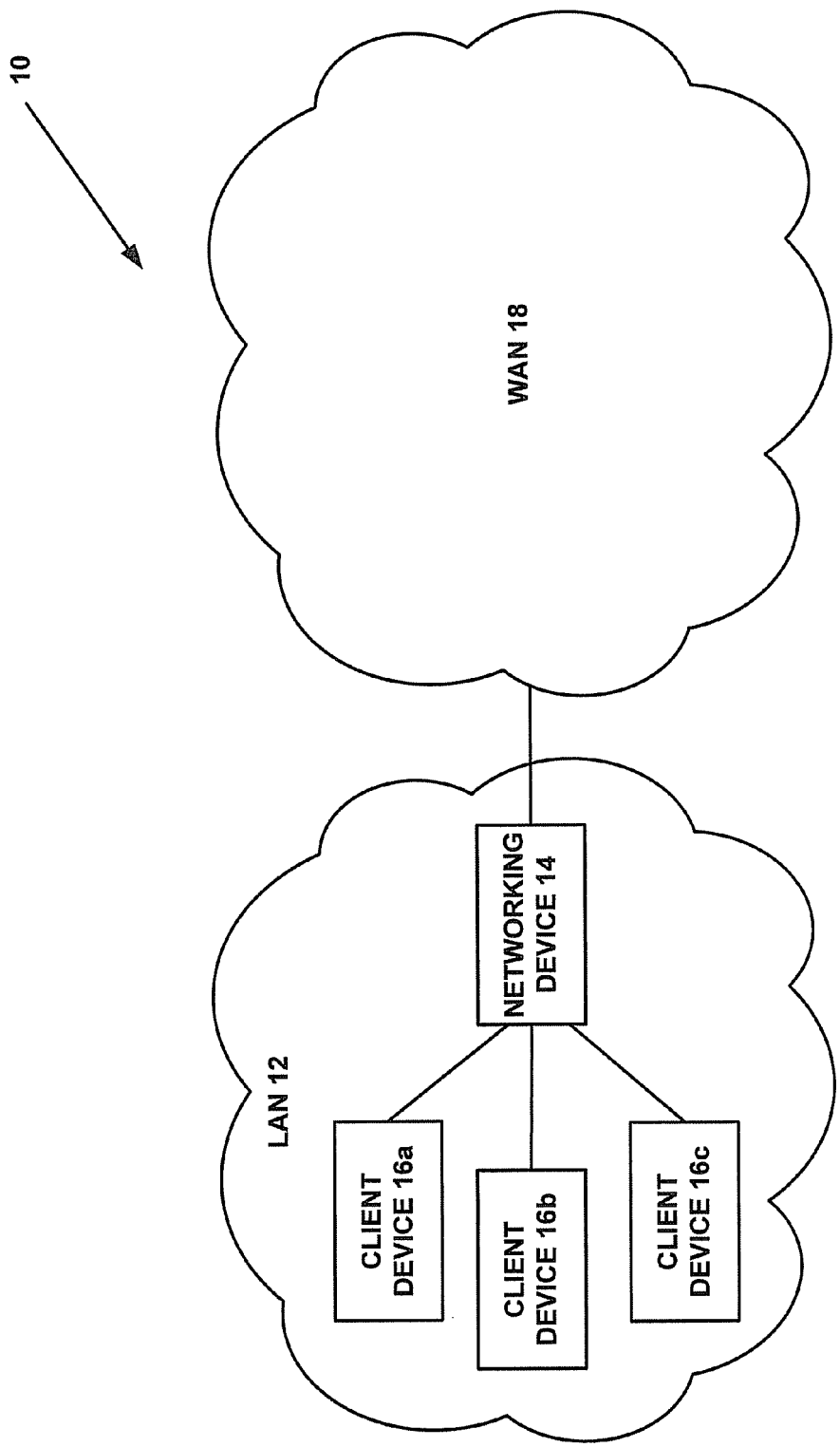
FIG. 1 is a simplified diagram of an exemplary communication system in which an exemplary protocol can be implemented.

FIG. 1 is a simplified diagram of an exemplary communication system 10 in which an exemplary protocol can be implemented. As shown, system 10 may include a local area network (LAN) 12 (e.g., a home network) having one or more networking devices, such as networking device 14, and one or more local client devices, such as client devices 16*a-c*. Further, as shown, system 10 may include a wide area network (WAN) 18 (e.g., the Internet) that provides connectivity between LAN 12 and one or more remote client devices. Various other configurations of system 10 are possible as well.

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software. For instance, various functions may be carried out by a processor executing a set of machine language instructions written in any suitable programming language (e.g., C, C++, Java, etc.) and stored in memory.

Networking device 14 may be any computing device configured to interconnect each of client devices 16*a-c*, to interconnect LAN 12 with WAN 18, and to carry out aspects of the exemplary protocol described herein. In this respect, networking device 14 may include a processor, data storage, a LAN communication interface, and a WAN communication interface. Further, networking device 14 may include various software components (e.g., program logic and program data) and resources (e.g., directories and/or files with associated metadata) stored in data storage. As examples, networking device 14 may take the form of a switch, a bridge, a router, and/or a gateway. Other configurations of network device 14 are possible as well.

Each of local client devices 16*a-c* may be any computing device configured to carry out aspects of the exemplary protocol described herein. In this respect, each of local client devices 16*a-c* may include a processor, data storage, a communication interface, and perhaps a user interface. Further, each of local client devices 16*a-c* may include various software components (e.g., program logic and program data) and resources (e.g., directories and/or files with associated metadata) stored in data storage. As examples, each of local client devices 16*a-c* may take the form of a desktop computer, a laptop, a netbook, a tablet, a smart phone, a personal digital assistant (PDA), a set-top box, or a network-attached storage (NAS) device. Other configurations of client devices 16*a-c* are possible as well.

As shown, each of local client devices 16*a-c* may be coupled to networking device 14 via a respective communication path. These paths may take various forms. For instance, some or all of these paths may include a wired link, such as twisted-pair copper cable, coaxial cable, and/or optical fiber cable for instance. Further, some or all of these paths may include a wireless link, such as Wi-Fi link for instance.

Further yet, some or all of these paths may include an intermediate networking and/or computing device. These paths may take other forms as well.

II. Exemplary Protocol

Disclosed herein is an exemplary protocol that enables seamless, secure information sharing between computing devices (e.g., client devices, networking devices, servers, etc.) in a network (e.g., a LAN). In one aspect, the exemplary protocol may provide various file services that enable access to resources stored on the computing devices in the network. These file services may take various forms. In one example, the file services may include file share services that each enables a computing device to make resources available for access by other computing devices and correspondingly enables the other computing devices to access the available resources. In another example, the file services may include one or more file sync services that each enables a group of computing devices to make resources available for synchronization with one another and correspondingly enables other computing devices to access the synchronized resources. In yet another example, the file services may include file search services that each enables a computing device to make resources available for search by other computing devices and correspondingly enables the other computing devices to conduct searches on the available resources based on metadata (e.g., file name, file type, etc.). Other examples are possible as well.

The aspects of the exemplary protocol may be carried various software components that may be installed on the computing devices in the network. These software components may each take the form of program instructions of various forms (e.g., object code, machine language code, bytecode, and/or source code) that are executable or interpretable by a processor to carry out aspects of the exemplary protocol. In an embodiment, these software components may include one or more APIs designed according to representational state transfer (REST) guidelines. The software components may take other forms as well.

a. Exemplary Protocol Components

Figure 2:
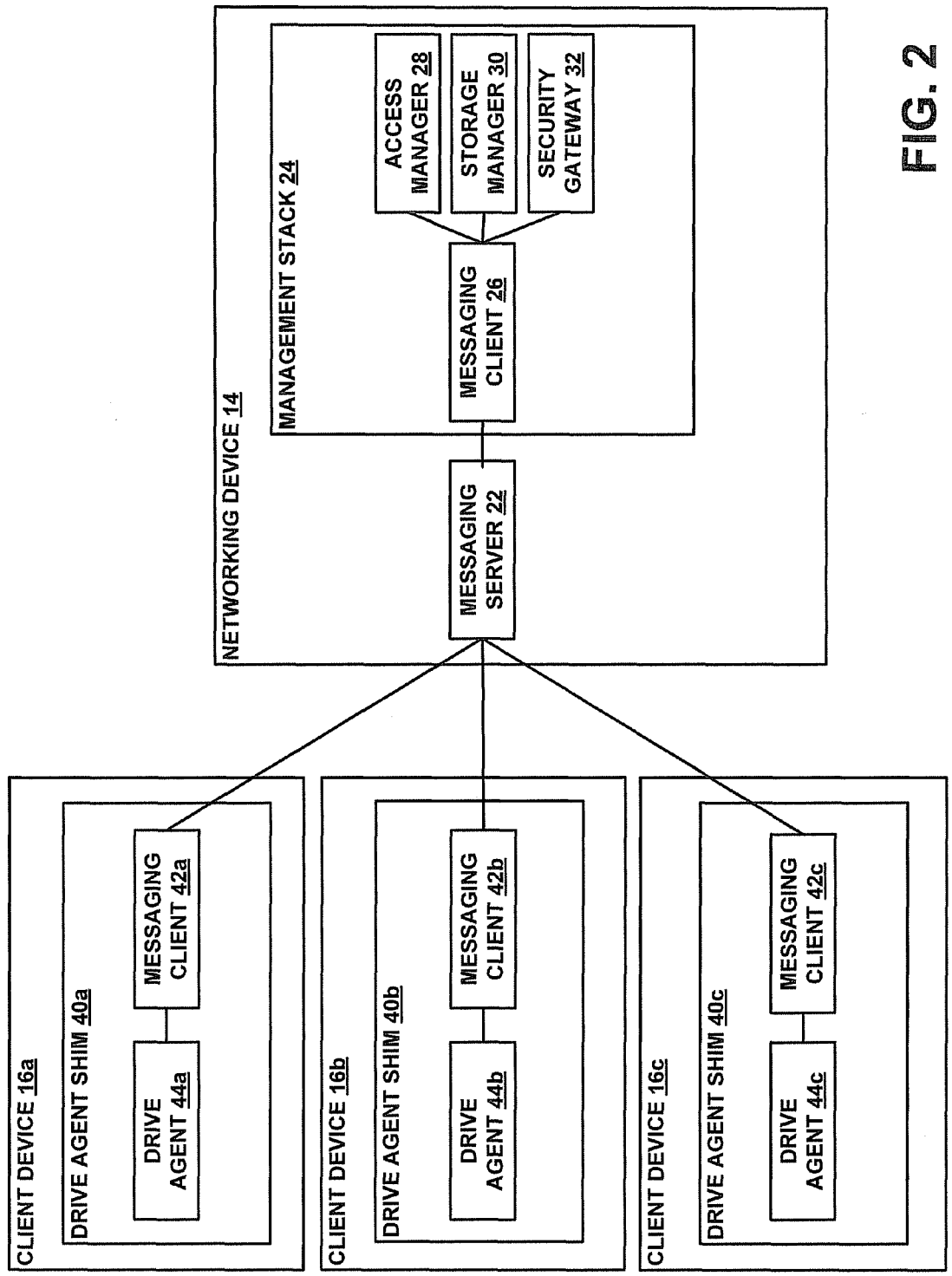
FIG. 2 is a simplified block diagram of components installed on the networking device and each of the client devices in the system of FIG. 1, according to an embodiment.

FIG. 2 is a simplified block diagram of software components configured to carry out features of the exemplary protocol, according to an example embodiment. For purposes of illustration, the exemplary protocol components are depicted as being installed on networking device 14 and each of client devices 16a-c. It should be understood, however, that the software components and associated functions described herein may be installed and/or stored on various computing devices or storage media in various forms (e.g., object code, machine language code, bytecode, and/or source code).

As shown in FIG. 2, networking device 14 may have installed thereon a messaging server 22 and a management stack 24 that includes a messaging client 26, an access manager 28, a storage manager 30, and a security gateway 32. Further, as shown, client devices 14 may each have installed thereon a drive agent shim 40 that includes a messaging client 42 and a drive agent 44. Many other configurations are possible as well. For example, although not shown, networking device 14 may also have installed thereon a drive agent shim.

Messaging server 22 may be configured to facilitate low-level communication between the computing devices and/or components of LAN 12. In this respect, messaging client 22 may communicate with each of messaging client 26 and messaging clients 42a-c according to various communication protocols. As one example, messaging server 22 may communicate with each of messaging client 26 and messaging clients 42a-c according to the Extensible Messaging and Presence Protocol (XMPP), which is an open, Extensible Markup Language (XML)-based protocol. According to XMPP, each of messaging client 26 and messaging clients 42a-c may establish a long-running Transmission Control Protocol (TCP) connection with Transport Layer Security (TLS) to messaging server 22. In turn, each of messaging client 26 and messaging clients 42a-c may open an XML document called a "stanza" for the lifetime of the established TCP connection and then append individual messages to the stanza, which may allow each of messaging client 26 and messaging clients 42a-c to send messages to messaging server 22 without the burden of opening and closing TCP connections. As such, according to XMPP, multiple higher-level operations can occur simultaneously over one TCP connection. Messaging client 22 may communicate with each of messaging client 26 and messaging clients 42a-c according to other communication protocols as well.

According to an embodiment, each of messaging client 26 and messaging clients 42a-c may be configured to have one dedicated messaging account for use when communicating according to the exemplary protocol. Each of messaging client 26 and messaging clients 42a-c may then be configured to filter received messages according to its dedicated account identifier (e.g., a JabberID in XMPP) and then route the received messages to other exemplary protocol components as appropriate. Correspondingly, a component installed on networking device 14 (e.g., access manager 28) may be configured to contain a mapping of messaging clients to messaging account identifiers.

Messaging server 22 may provision a messaging account with one of messaging client 26 and messaging clients 42a-c in various manners. For instance, a given drive agent shim on a hosting client device (e.g., any of drive agent shims 40a-c) may first perform an auto-discovery operation to locate messaging server 22 (e.g., via a DNS-DS mechanism) and may then initiate an auto-registration process by providing messaging server 22 with a device name and a registration identifier. The given agent shim may also display the registration identifier to a user of the hosting client device. Thereafter, the user may access a management interface provided by a component installed on networking device 14 to request addition of the drive agent shim to LAN 12. For example, while accessing the interface, the user may select the drive agent shim and then enter its registration identifier. In turn, the component on networking device 14 may validate the entered registration identifier against the registration identifier received from the drive agent shim during the auto registration process. If valid, the component on networking device 14 may generate a messaging account for the drive agent shim and then send a password for the account to the drive agent shim, which may in turn store the password for future use in establishing connections with messaging server 22. Other examples of messaging account provisioning methods may exist as well.

Access manager 28 may be configured to control access to the services provided by the exemplary protocol in LAN 12. In this respect, access manager 28 may include various components that enable it to perform the functions described herein.

Figure 3:
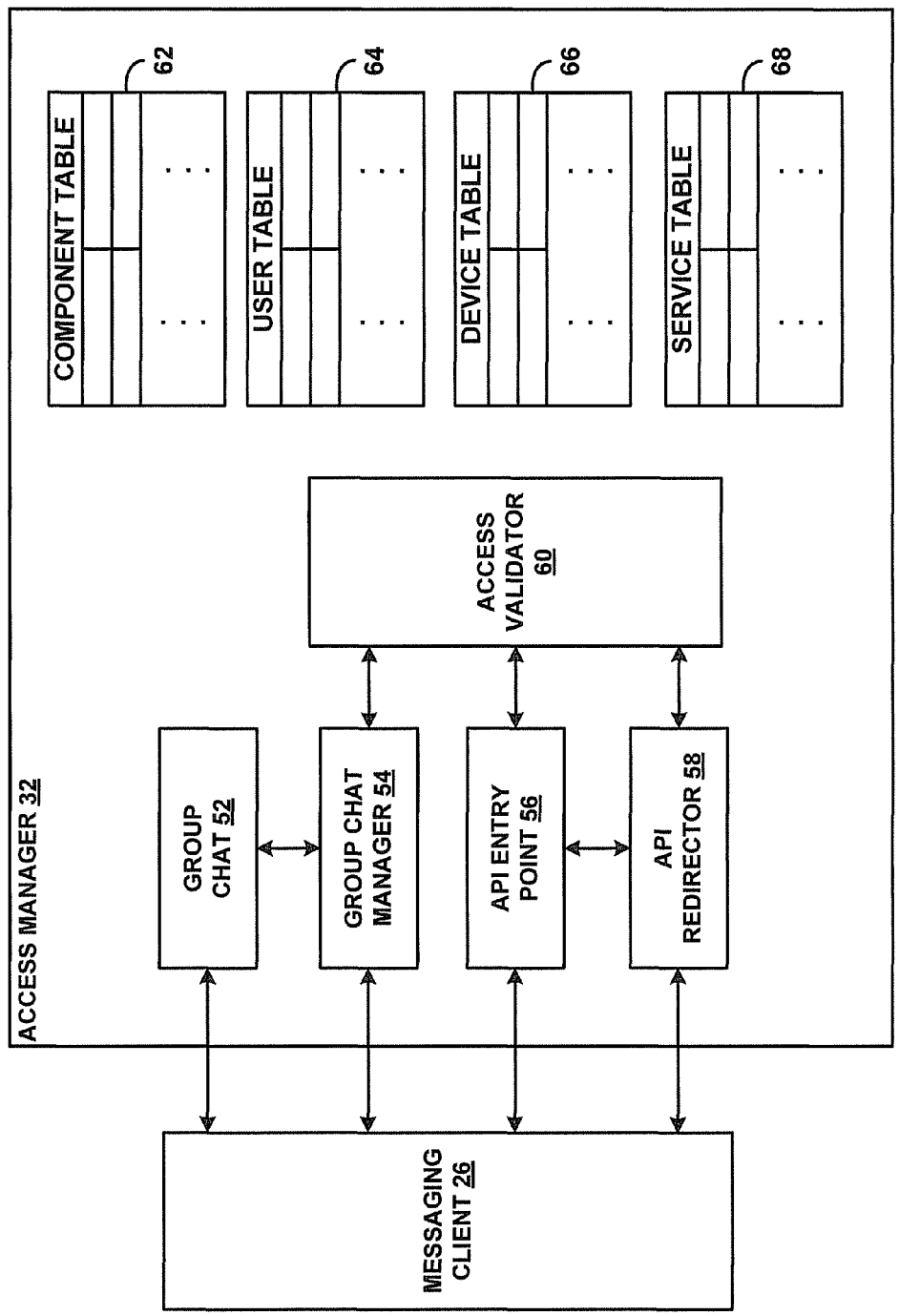
FIG. 3 is a simplified block diagram showing components of an access manager installed on the networking device in the system of FIG. 1, according to an example embodiment.

FIG. 3 is a simplified block diagram showing components of access manager 28, according to an example embodiment. As shown, access manager 28 may include a group chat component 52, a group chat manager 54, an API entry point 56, an API redirector 58, an access validator 60, a component table 62, a user table 64, a device table 66, and a service table 68. Other configurations of access manager 28 are possible as well.

Group chat component 52 may be configured to facilitate a chat room and thereby enable devices and/or components in LAN 12 to share status information (e.g., presence announcements). In one example, access manager 28 may create group chat component 52 on startup, after which time access manager 28 may receive requests to join the chat room from various components. Correspondingly, group chat manager 54 may be configured to manage access to group chat component 52.

API entry point 56 may be configured as the initial destination of all exemplary protocol API requests. Correspondingly, API redirector may 58 be configured to forward API request to the proper device(s) and/or component(s) of LAN 12 and access validator 60 may be configured to validate API requests against access privileges.

Component table 62 may be configured to contain a list of exemplary protocol components in LAN 12 (e.g., each of drive agent shims 40a-c). Additionally, component table 62 may be configured to contain a mapping between identifiers of exemplary protocol components in LAN 12 and corresponding messaging account identifiers (e.g., JabberIDs in XMPP). Additionally yet, component table 62 may be configured to contain current status information for the components in LAN 12, such as whether a component is online or offline. Such information may be obtained via chat room component 52. Other examples are possible as well.

User table 64 may be configured to contain a list of exemplary protocol users in LAN 12. Further, user table 64 may be configured to contain a mapping between identifiers of exemplary protocol users in LAN 12 and identifiers of devices and/or components in LAN 12 associated with each user. Other examples are possible as well.

Device table 66 may be configured to contain a list of exemplary protocol devices in LAN 12. Additionally, device table 66 may be configured to contain current status information for the exemplary protocol devices in LAN 12, such as whether a device is online or offline. Other examples are possible as well.

Service table 68 may be configured to contain a list of available file services provided by the exemplary protocol in LAN 12. Additionally, service table 68 may be configured to contain a mapping between each available file service and a list of users allowed to access that file service. In this respect, the list of users allowed to access a new file service may initially include only the creating user of that file service, and the creating user and/or an administrator may then update the list of users allowed to access the file service via a management interface. Other examples are possible as well.

Referring back to FIG. 2, storage manager 30 may be configured to manage the file services provided by the exemplary protocol in LAN 12. In this respect, storage manager 30 may include various components that enable it to perform the functions described herein.

Figure 4:
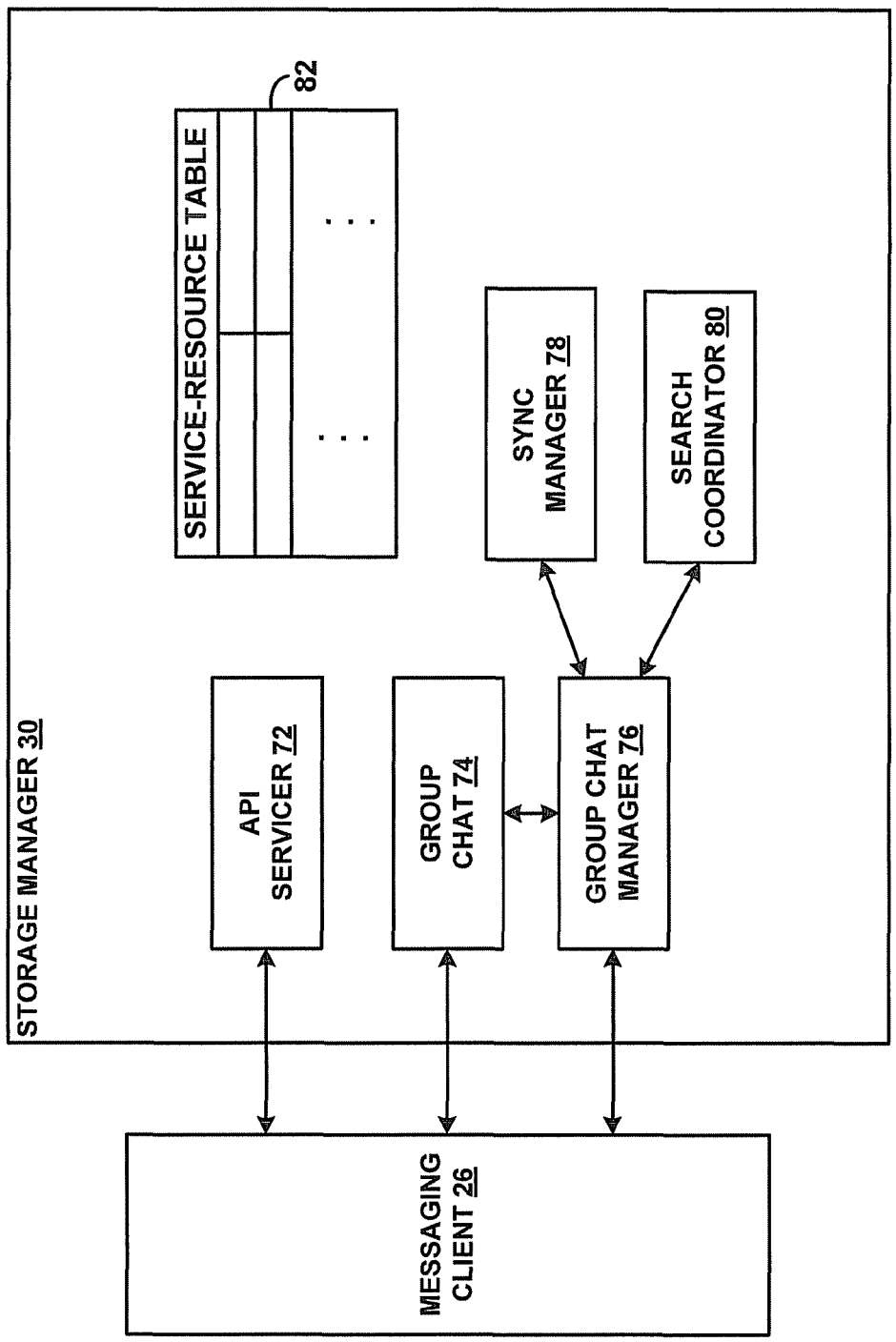
FIG. 4 is a simplified block diagram showing components of a storage manager installed on the networking device in the system of FIG. 1, according to an example embodiment.

FIG. 4 is a simplified block diagram showing components of storage manager 30, according to an example embodiment. As shown, storage manager 30 may include an API servicer 72, a group chat component 74, a group chat manager 76, a sync manager 78, a search manager 80, and a service-resource table 82. Other configurations of storage manager 30 are possible as well.

API servicer 72 may be configured to respond to API requests. For example, API servicer 72 may receive an API call and identify a component (e.g., one of drive agent shims 40a-c) to service the API call. Other examples are possible as well.

Group chat component 74 may be configured to facilitate a chat room and thereby enable devices and/or components in LAN 12 to report status and change information regarding resources in LAN 12. Correspondingly, group chat manager 76 may be configured to manage access to group chat component 74.

Sync manager 78 may be configured to monitor the chat room for status information relating to file sync services, such as announcements regarding changes to resources. Additionally, sync manager 78 may be configured to initiate sync sessions between components in LAN 12 participating in file sync services, such that all resources assigned to a file sync service remain synchronized.

Search manager 80 may be configured to coordinate search operations relating to any file search services.

Service-resource table 82 may be configured to contain a mapping between each file service provided by LAN 12 and a list of resources assigned to the file service. In this respect, service-resource table 82 may contain both a unique resource identifier of each stored resource assigned to a file service and an identifier of a device and/or component on which each resource is stored. Additionally, service-resource table 82 may be configured to contain status information for each resource assigned to a file service, such as whether a resource is available or unavailable. Other examples are possible as well.

Referring back to FIG. 2, security gateway 32 may be configured to facilitate secure access of resources stored on devices in LAN 12 by other devices via WAN 18. Security gateway may perform this function in any manner now know or later developed.

Drive agents 44a-c may each be configured to enable its hosting client device to participate in the file services provide by the exemplary protocol. For example, drive agents 44a-c may each receive and fulfill requests from users to assign stored resources to a file service. As another example, drive agents 44a-c may each receive and fulfill requests from native applications on a hosting client device to access a resource stored on another client device (or networking device 14). As yet another example, drive agents 44a-c may each receive and fulfill requests from storage manager 30 to provide a resource stored on a hosting client device to another client device (or networking device 14). Other examples are possible as well.

Drive agents 44a-c may each also include or have access to various other components that perform functions related to the file services provided by the exemplary protocol. For instance, drive agents 44a-c may each include or have access to a file system monitor configured to monitor and report changes to resources in the hosting client device's file system. As one example, drive agents 44a-c may each monitor resource changes using a file filtering service provided by the hosting client device's operating system. Correspondingly, drive agents 44a-c may each may track and record resource changes using a transaction log and/or a hash tree (e.g., a Merkle tree). Other examples are possible as well.

Further, drive agents 44a-c may each include or have access to a resource badge updater configured to manage badges for stored resources assigned to file services. These resource badges may take the form of a small graphic that is overlaid on the resource icon and displayed through the hosting client device's file browser to indicate whether the resource is up-to-date or out-of-date. In some embodiments, these resource badges may be written to the resource's metadata. Other examples are possible as well.

Further yet, drive agents 44a-c may each include or have access to a file context menu service configured to provide, for one or more resources on the hosting client device, a context menu that lists the file services to which the resource can be assigned. The file context menu service may provide this context menu in various manners. For example, the file context menu service may first obtain the list of available file services from service table 68 of access manager 28. In turn, the file context menu service may display file service options on a resource's general context menu, which may be accessible by right-clicking on the resource. Other examples are possible as well.

Still further, drive agents 44*a-c* may each include or have access to a resource-location table configured to contain a mapping between each stored resource assigned to an available file service and a storage location on the hosting client device of the resource. Other examples are possible as well.

Although not shown, drive agent shims 40*a-c* may each include other components as well. For example, drive agent shims 40*a-c* may each may include a working directory manager configured to provide one or more working directories on the hosting client device in which the exemplary protocol can store resources. In another example, drive agent shims 40*a-c* may each include a GUI configuration, which may various forms depending on the operating system of the hosting client device. Other examples are possible as well.

Within the configuration depicted in FIG. 2, the exemplary protocol may provide various addressing schemes for accessing resources and other information in LAN 12. For instance, the exemplary protocol may provide a uniform resource identifier (URI) addressing scheme for accessing resources and other information. In this respect, the URIs may take various forms. For example, each such URI may begin with "/[ExemplaryProtocolID]." A URI for accessing a resource assigned to a given file service may then include "/FileServices/[ServiceType]/[ServiceName]/[ResourceID]." In some embodiments, this URI may additionally include "/[DeviceName]" before /[ResourceID]." Further, a URI for accessing information stored in a data table may include "/Management/[TableName]." Other examples are possible as well.

b. Exemplary Resource Assignment

Figure 5:
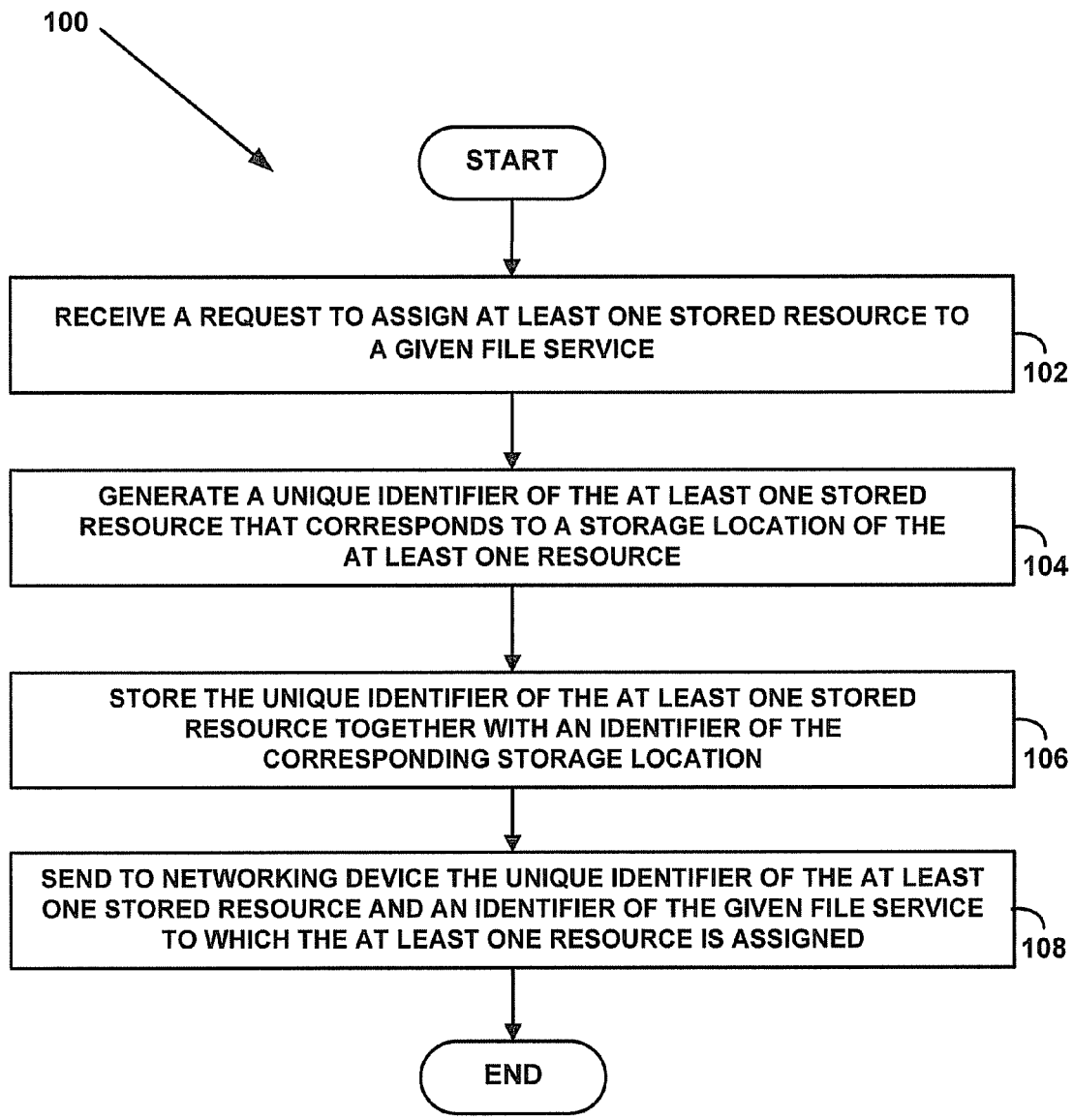
FIG. 5 is a flow chart depicting an exemplary method of assigning a stored resource to a file service.

As described above, the exemplary protocol may provide various file services that each enables a computing device to make stored resources available for access by other computing devices. FIG. 5 is a flow chart depicting a method 100 of assigning a stored resource to a file service, according to an example embodiment. For purposes of illustration, exemplary method 100 will be described with reference to client device 16*a* (and in particular drive agent shim 40*a* installed on client device 16*a*) assigning at least one stored resource to a given file service. It should be understood, however, that exemplary method 100 may be applicable to any computing device operating according to the exemplary protocol.

Exemplary method 100 may begin at step 102 with client device 16*a* receiving a request to assign at least one resource (e.g., a file and/or directory) stored on client device 16*a* to a given file service (e.g., a file share, file sync, or file search service). This request may take various forms. In one example, the request may take the form of a user's selection of a file service option on a context menu for the at least one stored resource. In this respect, as described above, client device 16*a* may be configured to display file service options in a context menu for one or more stored resources. Other examples are possible as well.

At step 104, in response to the request, client device 16*a* may generate a unique identifier of the at least one stored resource that correlates to a storage location of the at least one stored resource. The unique identifier may take various forms. In one example, the unique identifier may take the form of numerical string. Other examples are possible as well.

At step 106, client device 16*a* may also store the unique identifier of the at least one stored resource together with an identifier of its storage location. For instance, client device 16*a* may store the unique identifier of the at least one stored resource together with an identifier of its storage location in the resource-location table described above. The storage location identifier may take various forms. In one example, the storage location identifier may be a file path. Other examples are possible as well.

At step 108, client device 16*a* may send to networking device 14 the unique identifier of the at least one stored resource and an identifier of the given file service to which the at least one resource is assigned. The file service identifier may take various forms. In one example, the file service identifier may take the form of a text string. Other examples are possible as well.

As a result of client device 16*a* sending the unique identifier of the at least one stored resource and the identifier of the given file service, networking device 14 may receive the unique identifier of the at least one stored resource and the identifier of the given file service to which the at least one resource is assigned. In turn, networking device 14 may store the unique identifier of the at least one stored resource and an identifier of a device and/or component on which the at least one resource is stored (e.g., a JabberID in XMPP) together with the identifier of the given file service to which the at least one resource is assigned. For instance, networking device 14 may store the unique identifier of the at least one stored resource, the identifier of the device and/or component, and the identifier of the given file service in service-resource table 82 described above. Other examples are possible as well.

Advantageously, exemplary method 100 may enable a user of computing device 16*a* to make only certain stored resources available for access by other computing devices operating according to the exemplary protocol, while precluding access to all other stored resources.

c. Exemplary Resource Access

Figure 6:
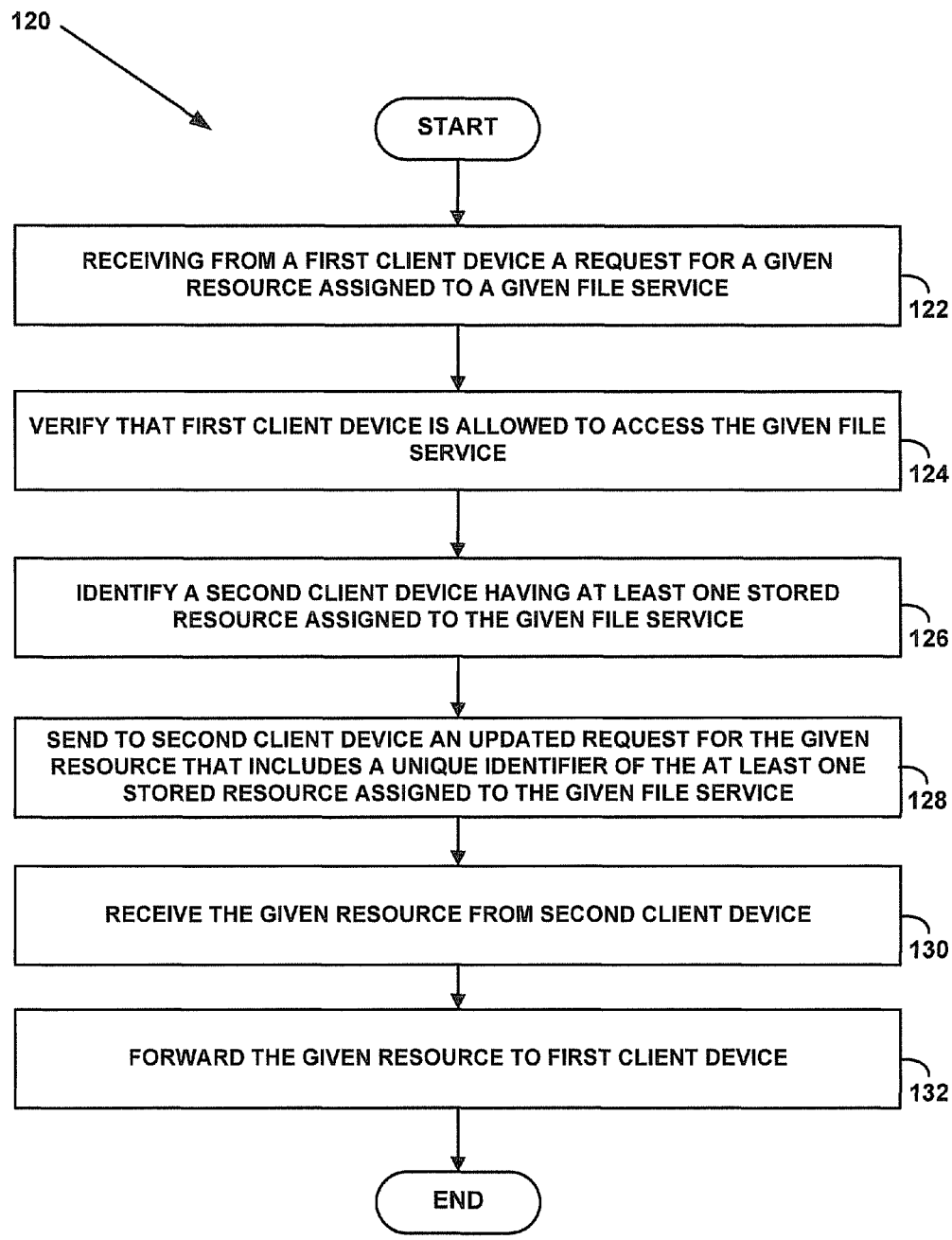
FIG. 6 is a flow chart depicting an exemplary method of facilitating access to a resource assigned to a given file service.

As described above, the exemplary protocol may provide various file services that each enables a computing device to access available resources stored on another computing device. FIG. 6 is a flow chart depicting an exemplary method 120 of facilitating access to a resource assigned to a given file service. For purposes of illustration, exemplary method 120 will be described with reference to network device 14 (e.g., access manager 28 and storage manager 30 installed on networking device 14) facilitating access to a resource assigned to a given file service, but it should be understood that exemplary method 120 may be applicable to any computing device operating according to the exemplary protocol.

Exemplary method 120 may begin with one of client devices 16*b-d*, such as client device 16*b*, sending a request for a given resource (e.g., a file, directory, and/or metadata) assigned to a given file service, such as a file share, a file sync, or a file search service for instance. (It should be understood that such a request may also be sent from a remote device via WAN 18). For instance, a native application installed on client device 14*b* may initiate such a request, and drive agent shim 40*b* installed on client device 14*b* may then be configured to detect the initiation of the request and responsively send the request to networking device 14. Other examples are possible as well.

At step 122, networking device 14 (e.g., access manager 28) may then receive the request from client device 16*b*. This request may include an identifier of the given resource and an identifier of the given file service. Further, in some embodiments, the request may include an identifier of another of client devices 16*a-c* from which to obtain the given resource. The request itself may take various forms. In one example, the request may include a URI as described above. Other examples are possible as well.

At step 124, in response to receiving the request, networking device 14 (e.g., access manager 28) may verify that client device 16b is allowed to access the given file service. For instance, networking device 14 may first identify a user associated with client device 16b (e.g., based on user table 64 described above). In turn, networking device 14 may determine that the identified user is allowed to access the given file service based on a table mapping file services to identifiers of users allowed to access the file services (e.g., service table 68 described above). Other examples are possible as well.

At step 126, in response to verifying that client device 16a is allowed to access the given file service, networking device 14 (e.g., storage manager 30) may identify a second one of client devices 16a-c having at least one stored resource assigned to the given file service. Networking device 14 may perform this identification in various manners. In one example, if the request for the given resource includes an identifier of another of client devices 16a-c from which to obtain the given resource, networking device 14 may identify that client device. In another example, networking device 14 may identify the other of client devices 16a-c based on a table mapping file services to client devices having at least one resource assigned to the file services (e.g., service table 68 described above). In this respect, if networking device 14 identifies two or more clients having at least one resource assigned to the given file service, networking device 14 may employ load balancing to select one of these client devices. Other examples are possible as well.

At step 128, networking device 14 (e.g., storage manager 30) may then send to the second one of client devices 16a-c, such as client device 16a, an updated request for the given resource. This updated request may include a unique identifier of the at least one stored resource assigned to the given file service. The updated request may include other information as well.

As a result of networking device 14 sending the updated request, client device 16a may receive the updated request. In turn, client device 16a may locate the given resource in storage based on a correlation of the unique identifier of the at least one stored resource to a storage location of the at least one stored resource (e.g., the resource-location table described above). For example, if the given resource is a file and the at least one stored resource is a directory, client device 16a may first locate the stored directory based on the correlation of the unique identifier of the stored directory to the storage location of the stored directory. Client device 16a may then located the file within the stored directory. Other examples are possible as well. After locating the given resource, client device 16a may then send the given resource for receipt by client device 16b.

At step 130, networking device 14 may receive the given resource from client device 16a. In turn, at step 132, networking device 14 may forward the given resource to client device 16b.

Advantageously, exemplary method 120 may enable computing device 16b to seamlessly access available resources stored on other of computing devices 16a-c. As such, together with exemplary method 100, exemplary method 120 may provide seamless, user-controllable information sharing between computing devices d. Additional Services The exemplary protocol described herein may also provide various other services. For example, the exemplary protocol may be configured to provide a unified desktop through which a user can launch applications and interact with widgets. As another example, the exemplary protocol may be configured to provide an application platform for web-based applications, along with APIs to access the application platform. As still another example, the exemplary protocol may further be configured to enable access to data on an information appliance in LAN 12. Other examples are possible as well.

IV. Conclusion

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
in a networking device coupled to a plurality of client devices, receiving from a first client device of the plurality of client devices a message indicating that at least one stored resource on the first client device has been assigned to a given file service, wherein the message includes a unique identifier of the at least one stored resource that correlates to a storage location of the at least one stored resource on the first client device;
the networking device thereafter receiving from a second client device of the plurality of client devices a request for a given resource assigned to the given file service;
in response to the request, the networking device verifying that the second client device is allowed to access the given file service;
after verifying that the second client device is allowed to access the given file service, the networking device identifying the first client device as a client device having at least one stored resource assigned to the given file service; and
the networking device sending to the first client device an updated request for the given resource that includes the unique identifier of the at least one stored resource on the first client device that has been assigned to the given file service, wherein the sending of the updated request causes the first client device to (a) receive the updated request, (b) locate the given resource on the first client device based on the given unique identifier of the at least one stored resource on the first client device that has been assigned to the given file service and a table mapping unique identifiers of stored resources on the first client device that have been assigned to file services to storage locations on the first client device of the resources, and (c) send the given resource to the networking device for receipt by the second client device.

2. The method of claim 1, further comprising:
as a result of sending the updated request to the second client device, the networking device receiving from the first client device the given resource; and
the networking device forwarding the given resource to the second client device.

3. The method of claim 1, wherein the given file service comprises one of a file share service, a file sync service, and a file search service.

4. The method of claim 1, wherein the given resource comprises one of a file, a directory, and metadata.

5. The method of claim 1, wherein the at least one resource assigned to the given file service comprises one or more of a file and a directory.

6. The method of claim 1, wherein verifying that the second client device is allowed to access the given file service comprises:
- identifying a user associated with the second client device; and
- determining that the identified user is allowed to access the given file service based on a table mapping file services to identifiers of users allowed to access the file services.

7. The method of claim 1, wherein the request received from the second client device identifies the first client device as a device from which to obtain the given resource, and wherein identifying the first client device as a client device having at least one stored resource assigned to the given file service comprises identifying the first client device based on the request.

8. The method of claim 1, wherein identifying the first client device as a client device having at least one stored resource assigned to the given file service comprises identifying the first client device based on a table mapping file services to client devices having at least one resource assigned to the given file service.

9. The method of claim 1, wherein identifying the first client device as a client device having at least one stored resource assigned to the given file service comprises:
- identifying two or more client devices of the plurality of client devices having at least one resource assigned to the given file service; and
- employing load balancing to select the first client device from the identified two or more client devices.

10. The method of claim 1, wherein the networking device and the plurality of client devices are part of a local area network.

11. The method of claim 1, wherein the networking device comprises one or more of a switch, a bridge, a router, and a gateway.

12. A method comprising:
- in a first client device of a plurality of client devices coupled to a networking device, receiving a request to assign a given directory stored on the first client device to a given file service;
- in response to the request to assign the given directory to the given file service, the first client device generating a unique identifier of the given directory that correlates to a storage location of the given directory on the first client device;
- the first client device sending to the networking device a message indicating that the given directory has been assigned to the given file service, wherein the message includes the unique identifier of the given directory;
- the first client device thereafter receiving from the networking device a request for a given file assigned to the given file service, wherein the request includes the unique identifier of the given directory on the first client device that has been assigned to the given file service;
- in response to receiving the request for the given file, the first client device (a) locating the given directory based on the correlation of the unique identifier of the given directory to the storage location of the given directory on the first client device and (b) locating the given file within the given directory; and
- the first client device sending the given file to the networking device for receipt by a second client device of the plurality of client devices.

13. The method of claim 12, wherein the request to assign the given directory to the given file service comprises selection of the given file service on a context menu for the given directory.

14. The method of claim 12, wherein the given file service comprises one of a file share service, a file sync service, and a file search service.

15. A networking device comprising:
- a communication interface configured to interface with a plurality of client devices; and
- a processor configured to:
  - enable the networking device to receive from a first client device of the plurality of client devices a message indicating that at least one stored resource on the first client device has been assigned to a given file service, wherein the message includes a unique identifier of at least one stored resource that correlates to a storage location of the at least one stored resource on the first client device,
  - enable the networking device to thereafter receive from a second client device of the plurality of client devices a request for a given resource assigned to the given file service,
  - in response to the request, verify that the second client device is allowed to access the given file service,
  - after verifying that the second client device is allowed to access the given file service, identify the first client device as a client device having at least one stored resource assigned to the given file service, and
  - cause the networking device to send to the first client device an updated request for the given resource that includes the unique identifier of the at least one stored resource on the first client device that has been assigned to the given file service, wherein the updated request directs the first client device to (a) locate the given resource on the first client device based on the given unique identifier of the at least one stored resource on the first client device that has been assigned to the given file service and a table mapping unique identifiers of stored resources on the first client device that have been assigned to file services to storage locations on the first client device of the resources, and (b) send the given resource to the networking device for receipt by the second client device.

16. The networking device of claim 15, wherein the processor is further configured to facilitate a group chat between the plurality of client devices.

17. The networking device of claim 15, further comprising:
- a first table mapping client devices to users; and
- a second table mapping file services with users allowed to access the file services.

18. The networking device of claim 15, further comprising:
- a table mapping file services to client devices having at least one resource assigned to the file services.

19. A client device comprising:
- a communication interface configured to interface with a networking device that is coupled to one or more other client devices; and
- a processor configured to:
  - enable the client device to receive a request to assign a given directory on the client device to a given file service,
  - in response to the request to assign the given directory to the given file service, generate a unique identifier of the given directory that correlates to a storage location of the given directory on the first client device,
  - cause the client device to send to the networking device a message indicating that the given directory has been assigned to the given file service, wherein the message includes the unique identifier of the given directory, enable the client device to thereafter receive from the networking device a request for a given file assigned to the given file service, wherein the request includes the unique identifier of the given directory on the first client device that has been assigned to the given file service, in response to the request for the given file (a) locate the given directory based on the correlation of the unique identifier of the given directory to the storage location of the given directory on the first client device and (b) locate the given file within the given directory, and cause the client device to send the given file to the networking device for receipt by another client device.

20. The client device of claim 19, wherein the processor is further configured to:

detect initiation of a request for a second given file stored on another client device that is assigned to the given file service, cause the client device to send the request for the second given file to the networking device for processing, and enable the client device to thereafter receive the second given file.

21. The client device of claim 19, further comprising:

a table mapping unique identifiers of stored directories assigned to file services to storage locations on the client device of the directories.

22. A non-transitory computer readable medium having instructions stored thereon, the instructions comprising:

instructions for enabling a networking device coupled to a plurality of client devices to receive, from a first client device of the plurality of client devices, a message indicating that at least one stored resource on the first client device has been assigned to a given file service, wherein the message includes a unique identifier of the at least one stored resource that correlates to a storage location of the at least one stored resource on the first client device;

instructions for enabling the networking device to thereafter receive, from a second client device of the plurality of client devices, a request for a given resource assigned to the given file service;

instructions for verifying that the second client device is allowed to access the given file service;

instructions for, after verifying that the second client device is allowed to access the given file service, identifying the first client device as a client device having at least one resource assigned to the given file service; and instructions for causing the networking device to send to the first client device an updated request for the given resource that includes the unique identifier of the at least one resource on the first client device that has been assigned to the given file service, wherein the updated request directs the first client device to (a) locate the given resource on the first client device based on the given unique identifier of the at least one stored resource on the first client device that has been assigned to the given file service and a table mapping unique identifiers of stored resources on the first client device that have been assigned to file services to storage locations on the first client device of the resources, and (b) send the given resource to the networking device for receipt by the second client device.

23. A non-transitory computer readable medium having instructions stored thereon, the instructions comprising:

instructions for enabling a first client device of a plurality of client devices coupled to a networking device to receive a request to assign a given directory stored on the first client device to a given file service;

instructions for, in response to the first client device receiving the request to assign the given directory to the given file service, generating a unique identifier of the given directory that correlates to a storage location of the given directory on the first client device;

instructions for causing the first client device to send to the networking device a message indicating that the given directory has been assigned to the given file service, wherein the message includes the unique identifier of the given directory;

instructions for causing the first client device to thereafter receive from the networking device a request for a given file assigned to the given file service, wherein the request includes the unique identifier of the given directory on the first client device that has been assigned to the given file service;

instructions for, in response to the request for the given file (a) locating the given directory based on the correlation of the unique identifier of the given directory to the storage location of the given directory on the first client device and (b) locating the given file within the given directory; and instructions for sending the given file to the networking device for receipt by a second client device of the plurality of client devices.

* * * * *